(12) United States Patent
Friel et al.

(10) Patent No.: US 10,783,436 B2
(45) Date of Patent: Sep. 22, 2020

(54) DEEP LEARNING APPLICATION DISTRIBUTION

(71) Applicant: Cisco Technology, Inc., San Jose, CA (US)

(72) Inventors: Joseph T. Friel, Ardmore, PA (US); Andre Surcouf, Saint-Leu-la-Foret (FR); Hugo Mike Latapie, Long Beach, CA (US); Enzo Fenoglio, Issy-les-Moulineaux (FR); Pascal Thubert, La-Colle-sur-Loup (FR)

(73) Assignee: Cisco Technology, Inc., San Jose, CA (US)

( * ) Notice: Subject to any disclaimer, the term of this patent is extended or adjusted under 35 U.S.C. 154(b) by 624 days.

(21) Appl. No.: 15/374,599

(22) Filed: Dec. 9, 2016

(65) Prior Publication Data

US 2018/0165579 A1   Jun. 14, 2018

(51) Int. Cl.
  *G06N 3/08*   (2006.01)
  *G06N 3/04*   (2006.01)
  *G06N 3/02*   (2006.01)
  *G06F 9/46*   (2006.01)

(52) U.S. Cl.
  CPC ............... *G06N 3/084* (2013.01); *G06F 9/46* (2013.01); *G06N 3/02* (2013.01); *G06N 3/0445* (2013.01); *G06N 3/08* (2013.01); *G06N 3/0454* (2013.01)

(58) Field of Classification Search
  CPC ...... G06N 3/02; G06F 11/3433; G06F 9/5083
  See application file for complete search history.

(56) References Cited

U.S. PATENT DOCUMENTS

| | | | |
|---|---|---|---|
| 10,019,470 B2* | 7/2018 | Birdwell | G06N 3/086 |
| 10,055,434 B2* | 8/2018 | Birdwell | G06N 3/0635 |
| 10,095,718 B2* | 10/2018 | Birdwell | G06F 16/22 |
| 10,248,675 B2* | 4/2019 | Birdwell | G06F 16/22 |
| 10,291,646 B2* | 5/2019 | Stolarz | H04W 12/12 |
| 10,404,740 B2* | 9/2019 | Stolarz | G06N 5/02 |
| 10,419,475 B2* | 9/2019 | Stolarz | H04L 63/1483 |
| 10,469,511 B2* | 11/2019 | Vasseur | H04L 43/024 |

OTHER PUBLICATIONS

Swiatek, P., et al., "Adaptive packet scheduling for requests delay guaranties in packet-switched computer communication network", 2010, Systems Science: 36(1): Jan. 7-12, 2010 (Year: 2010).*

Gehring, J., et al., "MARS—A framework for minimizing the job execution time in a metacomputing environment", 1996, Future Generation Computer Systems 12, (1996) 87-99 (Year: 1996).*

(Continued)

*Primary Examiner* — Michael B Holmes
(74) *Attorney, Agent, or Firm* — Behmke Innovation Group LLC; James M. Behmke; James J. Wong

(57) ABSTRACT

In one embodiment, a method includes training a deep neural network using a first set of network characteristics corresponding to a first time and a second set of network characteristics corresponding to a second time, generating, using the deep neural network, a predictive set of network characteristics corresponding to a future time, and assigning a task of a distributed application to a processing unit based on the predictive set of network characteristics.

20 Claims, 5 Drawing Sheets

(56) References Cited

OTHER PUBLICATIONS

Jozefowicz, R., et al., "An Empirical Exploration of Recurrent Network Architectures", 2015, Proceedings of the 32nd International conference on Machine Learning, 2015 (Year: 2015).*

Glorot, X., et al., "Deep Sparse Rectier Neural Networks", 2011, Appearing in Proceedings of the 14th International Conference on Articial Intelligence and Statistics (AISTATS) 2011, Fort Lauderdale, FL, USA. vol. 15 of JMLR: W&CP 15. (Year: 2011).*

Liu, Q., et al., "A speculative approach to spatial-temporal efficiency with multi-objective optimization in a heterogeneous cloud environment", 2016, Security Comm. Networks 2016; 9:4002-4012, Aug. 14, 2016 (Year: 2016).*

\* cited by examiner

DEEP LEARNING APPLICATION DISTRIBUTION

TECHNICAL FIELD

The present disclosure relates generally to application distribution systems, and in particular, to systems, methods and apparatuses for scheduling distributed applications using a deep learning architecture.

BACKGROUND

The ongoing development, maintenance, and expansion of distributed applications involve an increasing number of tasks to be performed. Scheduling the tasks of a distributed application can be performed to achieve a variety of goals. However, it can be challenging to optimize scheduling to achieve these goals in the face of real-world variability and uncertainty.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
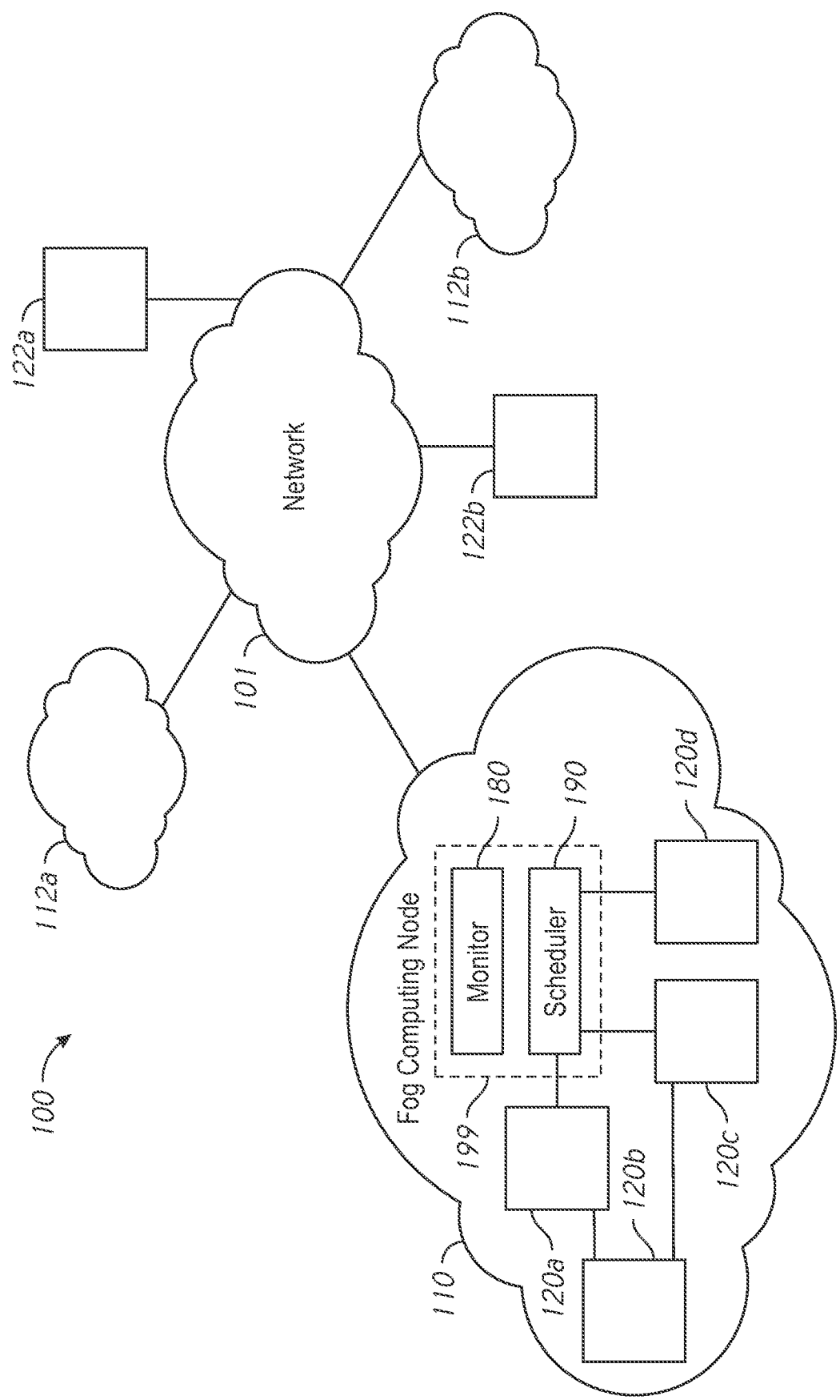
FIG. 1 is a functional block diagram of distributed application system in accordance with some implementations.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

OVERVIEW

Various implementations disclosed herein include apparatuses, systems, and methods for executing a distributed application. For example, in some implementations, a method includes training a deep neural network using a first set of network characteristics corresponding to a first time and a second set of network characteristics corresponding to a second time, generating, using the neural network, a predictive set of network characteristics corresponding to a future time, and assigning a task of a distributed application to a processing unit based on the predictive set of network characteristics.

EXAMPLE EMBODIMENTS

A distributed application simultaneously executes on multiple processing units. The multiple processing units can include, for example, processing threads of a single processor, individual cores of a multi-core chip, computers of a computer network, or containers of a cloud computing system. Each of the processing units pass messages to one another to execute the application and, thereby, achieve the purpose of the application. Problems to be solved by the application are divided into tasks and each task is performed by one or more of the processing units. Scheduling a distributed application involves decomposing the problems to be solved by the application into tasks, selecting the processing units to perform the tasks, and choosing a time to assign the tasks to the processing units.

Scheduling a distributed application can be performed to achieve a variety of goals. For example, a distributed application can be scheduled such that the problems to be solved are solved more quickly. As another example, a distributed application can be scheduled to provide redundancy in case of processing unit failure. As another example, a distributed application can be scheduled such that resources of the processing units (e.g., the processing hardware and/or storage hardware) are used less, e.g., by reducing redundant processing or storage. As another example, a distributed application can be scheduled to reduce network bandwidth usage, e.g., by reducing the amount of message passing performed by the processing units.

Achieving these goals can be difficult in the face of real-world variability and uncertainty. Such variability can come from many sources, including network and storage latencies, network bandwidth availability, storage availability, and competing priorities of tasks. Another source of variability is the data that the application processes. For example, an application behavior can be dependent upon data generated in real-time (e.g., by a social network or a sensor array).

In some embodiments, scheduling a distributed application can be performed by a centralized controller. Such a controller can make use of monitored network characteristics in order to make scheduling decisions. Such a controller can also make use of predicted network characteristics in order to make scheduling decisions. To that end, described herein is an in-network system that learns network behavior and makes its learning and predictions available to a scheduler via an application programming interface (API). An in-network system can take advantage of the fine-grained view of network transactions between processing units that are available at the network interchange.

In various implementations, as described in detail below, the in-network system is implemented as a deep learning neural network. A class of deep learning algorithms like, but not limited to, RNN (recurrent neural networks), LSTM (long/short-term memory neural networks), and VRAE (variational recurrent auto-encoders) can find underlying structure and patterns in time series of data. Further, such algorithms perform well with large sets of data from diverse sources, finding correlations or associations or similarities between loosely-related time series of variable size. Deep learning algorithms can also make predictions of future behavior with minimal assumptions on the sequence structure and considerable time lag between the inputs and their corresponding outputs.

FIG. 1 is a functional block diagram of network environment 100 in accordance with some implementations. The network environment 100 includes a fog computing node 110 with a number of processing units 120a-120d and a controller 199. The fog computing node 110 is configured to execute a distributed application. To that end, the processing units 120a-120d and the controller 199 are in communication with each other via a number of data links.

The processing units 120a-120d can include various computing resources, such as processing hardware and/or storage hardware. Different processing units 120a-120d can include different processing hardware, such as CPUs (central processing units), GPGPUs (general-purpose graphics processing units), FPGAs (field-programmable gate arrays), ASICs (application-specific integrated circuits), ASIPs (application-specific instruction set processors), and other processor architectures. Similarly, different processing units 120a-120d can include different storage hardware, such as volatile memory and/or non-volatile memory of various types.

The controller 199 includes a scheduler 190 that schedules the distributed application, including decomposing problems to be solved by the application into tasks, selecting the processing units to perform the tasks, and choosing when to assign the tasks to the various processing units.

The fog computing node 110 is coupled, via a network 101, to other computing systems. The other computing systems can include other processing units 122a-122b and/or other fog computing nodes 112a-112b, themselves including one or more processing units. The network 101 includes any public or private LAN (local area network) and/or WAN (wide area network), such as an intranet, an extranet, a virtual private network, a cable or satellite network, and/or portions of or the entirety of the internet.

The controller 199 includes a monitor 180 that monitors network traffic to determine network characteristics at various times. The network characteristics can include network traffic characteristics, such data rates of various agents (e.g., network users or subnets), bursting patterns of the data rates, round-trip times of data communications, traffic types and priorities, and queue and buffer utilization. The network characteristics can also include local switch/router characteristics, such as buffer sizes, queue-occupancy times, congestion avoidance parameters, and traffic-shaping parameters. In various implementations, the monitor 180 generates a first set of network characteristics corresponding to a first time by monitoring network traffic for the first time and generates a second set of network characteristics corresponding to a second time by monitoring network traffic for the second time. Based on the monitored traffic (and, in particular, the first and second set of network characteristics), the monitor 180 generates a predictive set of network characteristics corresponding to a future time. In various implementations, the monitor 180 includes a recurrent deep learning neural network used to generate the predictive set of network characteristics. The monitor 180 provides the predictive set of network characteristics to the scheduler 190 (e.g., via an API) and the scheduler 190 schedules the distributed application based on the predictive set of network characteristics.

Figure 2:
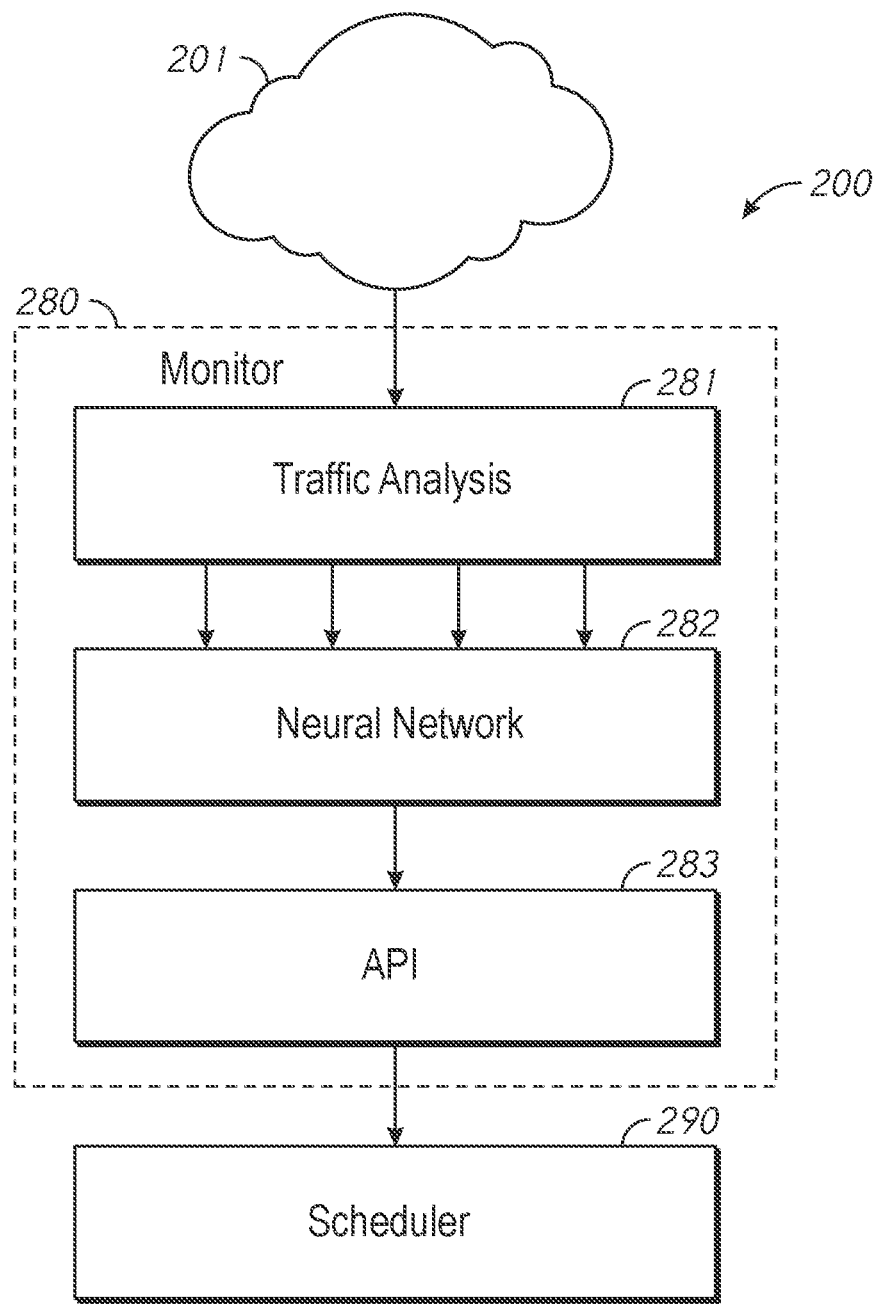
FIG. 2 illustrates a functional block diagram of a predictive monitoring system in accordance with some implementations.

FIG. 2 illustrates a functional block diagram of a predictive monitoring system 200 in accordance with some implementations. The predictive monitoring system 200 includes a monitor 280 coupled to a network 201. The monitor 280 inspects traffic over the network and includes a traffic analysis unit 281 that generates, based on the inspected traffic, sets of network characteristics.

The monitor 280 includes a neural network 282 that receives the network characteristics and generates a predictive set of network characteristics. In various implementations, the neural network 282 is a recurrent neural network (RNN). In particular implementations, the neural network 282 is a long short term memory (LSTM) neural network. The predictive set of network characteristics (and, in some embodiments, at least a portion of the network characteristics generated by the traffic analysis unit 281) are provided, via an API 283 of the monitor 280, to a scheduler 290.

The neural network 282 can includes a number of interconnected layers. Thus, the neural network system can implement a deep learning architecture including multiple processing layers, composed of multiple linear and/or non-linear transformations. The deep learning architecture can be generative, discriminative, sequential, and/or reinforcement learning based. Each layer can be implemented as neural network to produce outputs based on received inputs. Each neural network includes a plurality of interconnected nodes that instruct the learning process and produce the best output according to a suitable loss function that updates the neural network by back-propagation of the gradient of that loss function. In various implementations, the loss functions can be any of the typical loss function (hinge loss, least square loss, cross-entropy loss, etc.) or can be a custom loss function that incorporates typical network behaviors.

In various implementations, the network characteristics provided as inputs to the neural network 282 include a first set of network characteristics associated with a first time and a second set of network characteristics associated with a second time. Each of the first set of network characteristics and the second set of network characteristics include multiple network measurements, thus the neural network implements multimodal learning. In various implementations, the neural network 282 receives sets of network characteristics associated with more than two times, e.g., three times, five times, ten times, or twenty times.

In some embodiments, the neural network 282 includes a first sparse coding that extracts features for each input sequence (e.g., each of the first set of network characteristics and second set of network characteristics) and a second sparse coding layer that layer that receives the extracted features and learns the relationships between and among the input sequences (generating a relationship vector). Further, the neural network 282 includes a predictive layer that receives the relationship vector. The predictive layer can be implemented as a Support Vector Machine (SVM) layer or any other multivariate regression method.

Figure 3:
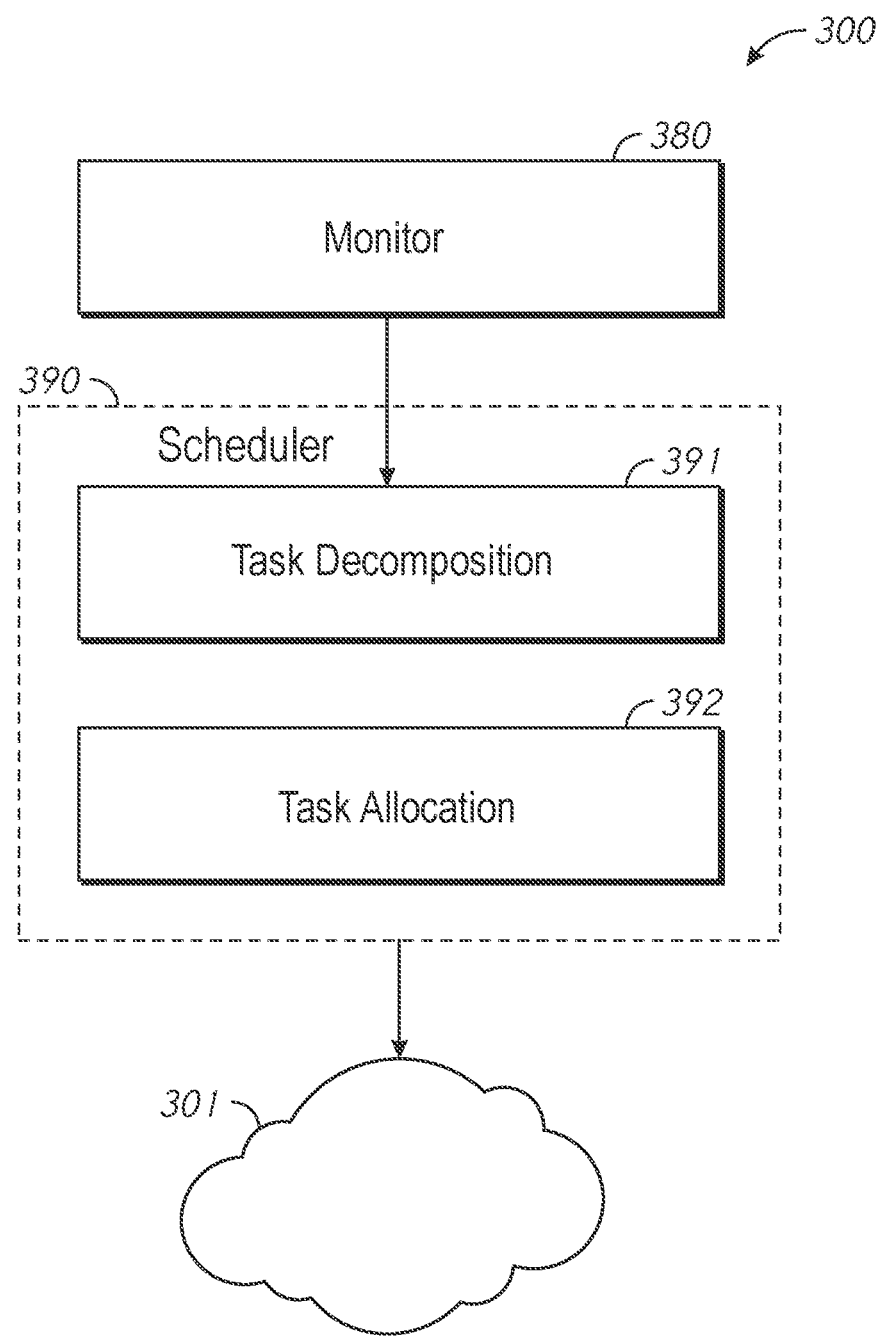
FIG. 3 is a functional block diagram of a scheduling system in accordance with some implementations.

FIG. 3 is a functional block diagram of a scheduling system 300 in accordance with some implementations. The scheduling system 300 includes a scheduler 390 that receives network characteristics from a monitor 380. In various implementations, the scheduler 390 receives predictive network characteristics corresponding to a future time from the monitor 380. In some embodiments, the scheduler 390 also, or alternatively, receives network characteristics corresponding to a current time or past times from the monitor 380.

The scheduler 390 includes a task decomposition unit 391 that decomposes problems to be solved by an application into one or more tasks. The scheduler 390 includes a task allocation unit 392 that selects processing units to perform each of the tasks and chooses when to assign the task to the selected processing units. Instructions to perform the tasks can be transmitted to the selected processing units via a network 301.

In various implementations, the task decomposition unit 391 generates tasks based on network characteristics received from the monitor 380. While the initial steps in task decomposition for distributed applications, such as identifying task and data parallelism, can be performed during simulation and design stages, the actual dataflow is often influenced by real-time constraints, such as network throughput and latencies and external data-dependencies. The network characteristics received from the monitor 380 can suggest optimizations such as "increase bandwidth here," or the assumption that non-blocking is a must everywhere may be proven unnecessary and in that case, savings and optimizations become possible.

Speculative execution involves performance of tasks to generate results that may not be used. In general, the task is performed before it is known whether the results of the task are to be used in order to prevent delay that would be incurred in performing the task after it is known whether the results of the task are to be used. Whereas speculative execution has been employed in on-chip architectures to provide concurrency, accurate predictive network characteristics can enable speculative execution to be performed in large-scale distributed systems.

Thus, in some implementations, based on predictive network characteristics, the task decomposition unit 391 generates tasks using speculative execution assumptions. For example, the task decomposition unit 391 can generate tasks for both sides of a conditional branch, even though the results are committed only if the predicate is true. Generally, the task decomposition unit 391 can generate a task to be executed on a predicted predicate (e.g., a predicted value), even though the results are committed only if the prediction is correct.

In various implementations, the task allocation unit 392 allocates tasks based on network characteristics received from the monitor 380. For example, the task allocation unit 392 can select a particular processing unit based on predictive network characteristics. As a particular example, the predictive network characteristics could indicate that a processing unit that is currently busy will be much less busy in the near future. In response, the task allocation unit 392 can counter-intuitively allocate tasks to the busy processing unit knowing that it will soon be able to complete the tasks efficiently.

In some implementations, the task allocation unit 392 can migrate tasks from one processing unit to another based on the predictive network characteristics. Virtual machine (VM) and container migration can occur in data centers for load balancing or software or hardware updates during long-running tasks. However, task migration could be used for efficiency purposes. For example, based on the predictive network characteristics, the task allocation unit 392 can move virtual machines or containers to defragment local resources. As another example, the task allocation unit 392 can migrate tasks from a local processing unit (e.g., within a fog computing node) to a remote processing unit (e.g., part of a remote data center).

Figure 4:
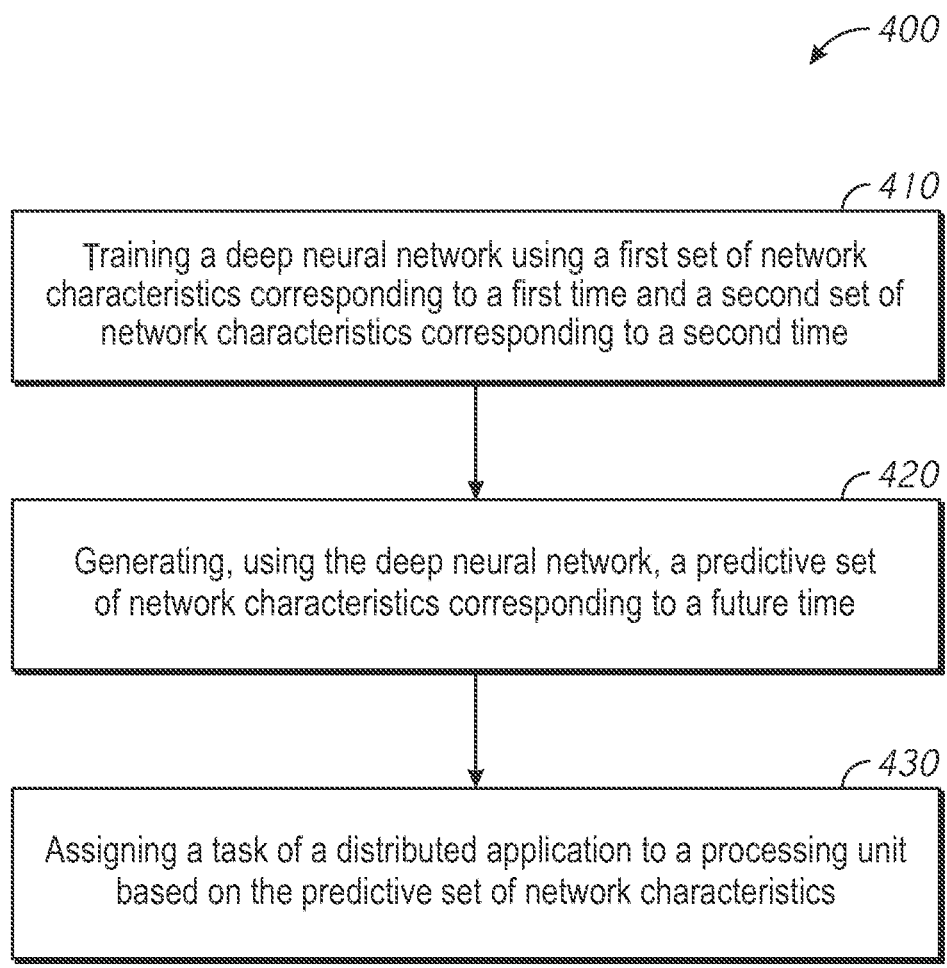
FIG. 4 is a flowchart representation of a method of executing a distributed application in accordance with some implementations.

FIG. 4 is a flowchart representation of a method 400 of executing a distributed application in accordance with some implementations. In some implementations (and as detailed below as an example), the method 400 is performed by a controller (or a portion thereof), such as the controller 199 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes assigning a task of a distributed application to a processing unit in a network based on a prediction about the behavior of the network generated by a neural network.

The method 400 beings, at block 410, with the controller training a neural network using a first set of network characteristics corresponding to a first time and a second set of network characteristics corresponding to a second time. In various implementations, the first set of network characteristics includes at least one value indicative of a data rate (which can be a value indicative of a bursting pattern of a data rate), a round-trip travel time, a traffic type or priority, or storage utilization (e.g., queue utilization or buffer utilization).

In various implementations, the controller generates the first set of network characteristics and second set of network characteristics by monitoring execution of a distributed application within a network, e.g., monitoring traffic over the network associated with the distributed application. In some embodiments, the controller generates the first set of network characteristics and the second set of network characteristics by aggregating raw data generated by inspecting the traffic over the network.

The method continues, at block 420, with the controller generating, using the neural network, a predictive set of network characteristics corresponding to a future time. Whereas, in some implementations, a predictive set of network characteristics is generated using a rule-based prediction algorithm, the method 400 uses a deep neural network to find latent relationships and make successful predictions. In various implementations, the deep neural network is a recurrent neural network, such as a long short term memory (LSTM) neural network. In various implementations, the neural network is a deep learning neural network that includes a plurality of neural network layers. For example, the plurality of layers can include a first sparse coding layer configured to generate first features of the first set of network characteristics and second features of the second set of network characteristics, a second sparse coding layer configured to generate interrelationships between the first features and second features, and a predictive layer configured to generate at least one of the predictive set of network characteristics based on the interrelationships.

The method continues, at block 430, with the controller assigning a task of a distributed application to a processing unit based on the predictive set of network characteristics. In various implementations, the controller assigns various different tasks to multiple different processing units or multiple different sets of processing units.

In some embodiments, the controller selects the processing unit based on the predictive set of network characteristics. For example, if the predictive set of network characteristics indicate that more network bandwidth will soon be available, the controller can assign a task to a remote processing unit that it would otherwise avoid assigning a task to if the predictive set of network characteristics did not indicate that more network bandwidth will soon be available.

In some embodiments, assigning the task includes migrating the task to the processing unit from a second processing unit based on the predictive set of network characteristics. For example, if the predictive set of network characteristics indicate that the second processing unit will soon receive high priority tasks from another application, the controller can migrate the task from the second processing unit to one that will have more available processing power at that time.

In some embodiments, assigning the task includes generating the task from a problem to be solved by the distributed application based on the predictive set of network characteristics. For example, if the predictive set of network characteristics indicate many available resources, the controller can decompose problems into tasks using a blocking protocol rather than a non-blocking protocol.

In some embodiments, assigning the task includes assigning a speculative task to the processing unit based on the predictive set of network characteristics. For example, if the predictive set of network characteristics indicate many available resources, the controller can generate (and assign) a task to be executed on a predicted predicate (e.g., a predicted value), even though the results are committed only if the prediction is correct.

Figure 5:
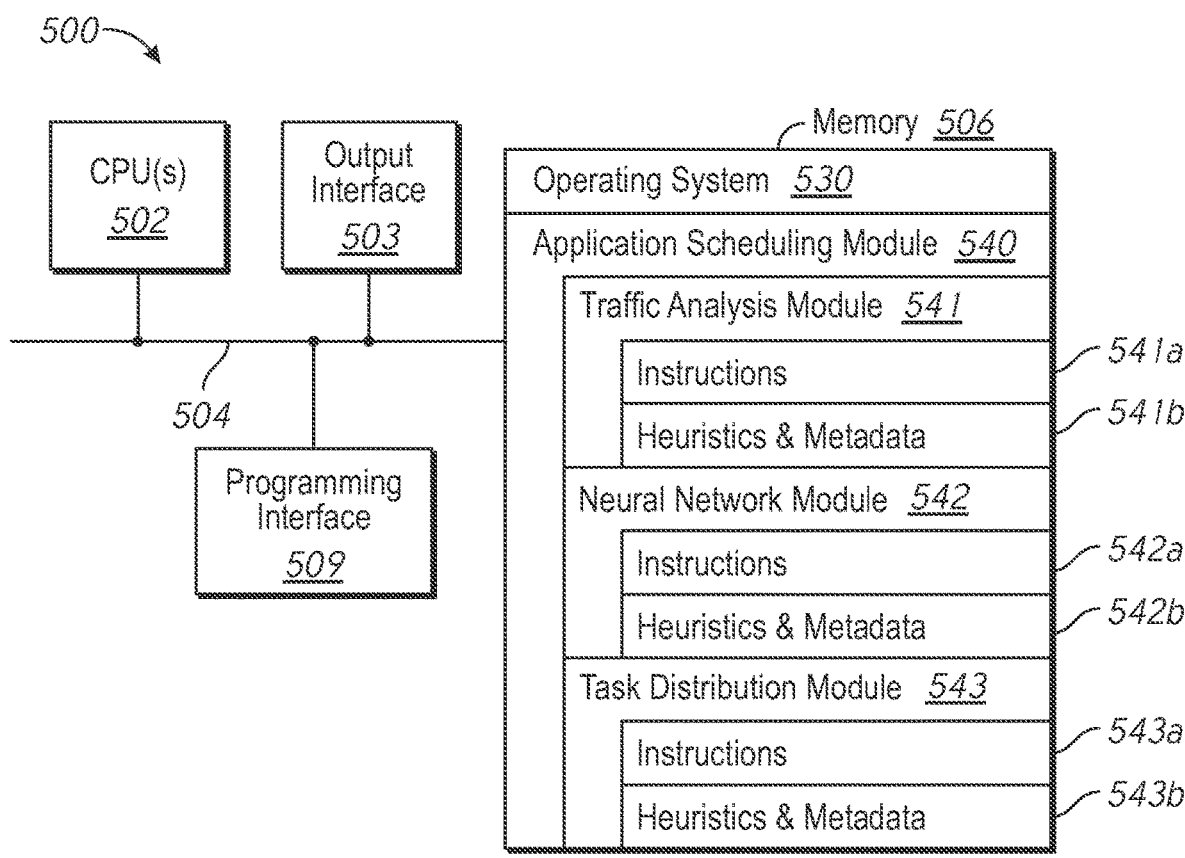
FIG. 5 is a block diagram of a computing device in accordance with some implementations.

FIG. 5 is a block diagram of a computing device 500 in accordance with some implementations. In some implementations, the computing device 500 corresponds to at least a portion of the controller 199 of FIG. 1 performs one or more of the functionalities described above with respect to the controller 199. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 500 includes one or more processing units (CPU's) 502 (e.g., processors), one or more input/output interfaces 503 (e.g., a network interface and/or a sensor interface), a memory 506, a programming interface 509, and one or more communication buses 504 for interconnecting these and various other components.

In some implementations, the communication buses 504 include circuitry that interconnects and controls communications between system components. The memory 506 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some implementations, the memory 506 or the non-transitory computer readable storage medium of the memory 506 stores the following programs, modules and data structures, or a subset thereof including an optional operating system 530 and analytic module 540. In some implementations, one or more instructions are included in a combination of logic and non-transitory memory. The operating system 530 includes procedures for handling various basic system services and for performing hardware dependent tasks. In some implementations, the analytic module 540 is configured to generate one or more behavioral analytic metrics and provide notifications based on the metrics. To that end, the application scheduling module 540 includes a traffic analysis module 541, a neural network module 542, and a task distribution module 543.

In some implementations, the traffic analysis module 541 is configured to monitor execution of a distributed application within a network to generate a first set of network characteristics corresponding to a first time and a second set of network characteristics corresponding to a second time. To that end, the traffic analysis module 541 includes a set of instructions 541a and heuristics and metadata 541b. In some implementations, the neural network module 542 is configured to train a neural network using the first set of network characteristics corresponding to the first time and the second set of network characteristics corresponding to the second time. In some embodiments, the neural network module 542 is configured to generate, using the neural network, a predictive set of network characteristics corresponding to a future time. To that end, the neural network module 542 includes a set of instructions 542a and heuristics and metadata 542b. In some implementations, the task distribution module 543 is configured to assign a task of a distributed application to a processing unit based on the predictive set of network characteristics. To that end, the task distribution module 543 includes a set of instructions 543a and heuristics and metadata 543b.

Although the application scheduling module 540, the traffic analysis module 541, the neural network module 542, and the task distribution module 543 are illustrated as residing on a single computing device 500, it should be understood that in other embodiments, any combination of the application scheduling module 540, the traffic analysis module 541, the neural network module 542, and the task distribution module 543 can reside in separate computing devices in various implementations. For example, in some implementations each of the application scheduling module 540, the traffic analysis module 541, the neural network module 542, and the task distribution module 543 reside on a separate computing device or in the cloud.

Moreover, FIG. 5 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GPGPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method, comprising:
   receiving, at a controller in a local area network (LAN), a first set of network characteristics and a second set of network characteristics that each comprise respective network measurements associated with a plurality of devices in the LAN that execute a distributed application, wherein the first set of network characteristics correspond to a first time and the second set of network characteristics correspond to a second time;
   training, by the controller, a deep neural network by using the first set of network characteristics and the second set of network characteristics as inputs for the deep neural network, wherein the deep neural network implements multimodal learning using a plurality of deep neural network layers;
   generating, by the controller and using the deep neural network, a predictive set of network characteristics of the distributed application corresponding to a future time based on interrelationships identified between features generated from the first set of network characteristics and the second set of network characteristics, wherein the predictive set of network characteristics are indicative of availability of network bandwidth, network latency, or network throughput of one device of the plurality of devices in the LAN at the future time; and
   causing, by the controller, an assignment of a task of the distributed application to one or more devices in the LAN based on the predictive set of network characteristics.

2. The method of claim 1, wherein the network measurements of performance of the distributed application comprise at least two of: data rate, a round-trip travel time, a traffic type or priority, or storage utilization.

3. The method of claim 1, wherein assigning the task includes selecting the one or more devices in the LAN based on the predictive set of network characteristics.

4. The method of claim 1, wherein assigning the task includes migrating the task to the one or more devices in the LAN from one or more other devices in the LAN based on the predictive set of network characteristics.

5. The method of claim 1, wherein assigning the task includes generating the task from a problem to be solved by the distributed application based on the predictive set of network characteristics.

6. The method of claim 1, wherein assigning the task includes assigning a speculative task to the one or more devices in the LAN based on the predictive set of network characteristics.

7. The method of claim 1, wherein the deep neural network is a recurrent neural network.

8. The method of claim 7, wherein the deep neural network is a long short term memory neural network.

9. The method of claim 1, wherein the plurality of deep neural network layers includes a first sparse coding layer configured to generate first features of the first set of network characteristics and second features of the second set of network characteristics, a second sparse coding layer configured to generate the interrelationships, and a predictive layer configured to generate at least one of the predictive set of network characteristics.

10. A system comprising:
    one or more processors; and
    a non-transitory memory comprising instructions that when executed cause the one or more processors to perform operations comprising:
    receiving, at a controller in a local area network (LAN), a first set of network characteristics and a second set of network characteristics that each comprise respective network measurements associated with a plurality of devices in the LAN that execute of a distributed application, wherein the first set of network characteristics correspond to a first time and the second set of network characteristics correspond to a second time;
    training, by the controller, a deep neural network by using the first set of network characteristics and the second set of network characteristics as inputs for the deep neural network, wherein the deep neural network implements multimodal learning using a plurality of deep neural network layers;
    generating, by the controller and using the deep neural network, a predictive set of network characteristics of the distributed application corresponding to a future time based on interrelationships identified between features generated from the first set of network characteristics and the second set of network characteristics, wherein the predictive set of network characteristics are indicative of availability of network bandwidth, network latency, or network throughput of one device of the plurality of devices in the LAN at the future time; and causing, by the controller, an assignment a task of the distributed application to one or more device in the LAN based on the predictive set of network characteristics.

11. The system of claim 10, wherein assigning the task includes selecting the one or more devices in the LAN based on the predictive set of network characteristics.

12. The system of claim 10, wherein assigning the task includes migrating the task to the one or more devices in the LAN from one or more other devices in the LAN based on the predictive set of network characteristics.

13. The system of claim 10, wherein assigning the task includes generating the task from a problem to be solved by the distributed application based on the predictive set of network characteristics.

14. The system of claim 10, wherein assigning the task includes assigning a speculative task to the one or more devices in the LAN based on the predictive set of network characteristics.

15. A tangible, non-transitory, computer-readable medium storing program instructions that cause a controller in a local area network (LAN) to execute a process comprising:

receiving a first set of network characteristics and a second set of network characteristics that each comprise respective network measurements associated with a plurality of devices in the LAN that execute a distributed application, wherein the first set of network characteristics correspond to a first time and the second set of network characteristics correspond to a second time;

training a deep neural network by using the first set of network characteristics and the second set of network characteristics as inputs for the deep neural network, wherein the deep neural network implements multimodal learning using a plurality of deep neural network layers;

generating, using the deep neural network, a predictive set of network characteristics of the distributed application corresponding to a future time based on interrelationships identified between features generated from the first set of network characteristics and the second set of network characteristics, wherein the predictive set of network characteristics are indicative of availability of network bandwidth, network latency, or network throughput of one device of the plurality of devices in the LAN at the future time; and causing, by the device, an assignment a task of the distributed application to one or more devices in the LAN based on the predictive set of network characteristics.

16. The tangible, non-transitory, computer-readable medium of claim 15, wherein the network measurements of performance of the distributed application comprise at least two of: data rate, a round-trip travel time, a traffic type or priority, or storage utilization.

17. The tangible, non-transitory, computer-readable medium of claim 15, wherein assigning the task includes selecting the one or more devices in the LAN based on the predictive set of network characteristics.

18. The tangible, non-transitory, computer-readable medium of claim 15, wherein assigning the task includes migrating the task to the one or more devices in the LAN from one or more other devices in the LAN based on the predictive set of network characteristics.

19. The tangible, non-transitory, computer-readable medium of claim 15, wherein assigning the task includes generating the task from a problem to be solved by the distributed application based on the predictive set of network characteristics.

20. The tangible, non-transitory, computer-readable medium of claim 15, wherein assigning the task includes assigning a speculative task to the one or more devices in the LAN based on the predictive set of network characteristics.

* * * * *